United States Patent

[11] 3,599,226

[72] Inventor Theodoor Maria Albert Lips
Emmasingel, Eindhoven, Netherlands
[21] Appl. No. 812,804
[22] Filed Apr. 2, 1969
[45] Patented Aug. 10, 1971
[73] Assignee U.S. Philips Corporation
New York, N.Y.
[32] Priority Apr. 27, 1968
[33] Netherlands
[31] 6,806,033

[54] MAGNETIC RECORD ELEMENT
5 Claims, 2 Drawing Figs.

[52] U.S. Cl. 346/74 MD, 346/137
[51] Int. Cl. G01d 15/12, G01d 15/34, G11d 25/04
[50] Field of Search 346/74 M, 74 MD, 137; 179/100.2 A

[56] References Cited
UNITED STATES PATENTS
3,037,205 5/1962 Hagopian 346/74

*Primary Examiner*—Bernard Konick
*Assistant Examiner*—Gary M. Hoffman
*Attorney*—Frank R. Trifari

ABSTRACT: A magnetic recording element for recording and/or playing back magnetic records by means of one or more magnetic heads comprised of a wheel-shaped disc having a hub and rim connected by spoke elements. The record medium is carried on a disc-shaped foil which forms the upper and lower surfaces of the wheeled disc. The foil has a central opening which is larger than the diameter of the hub of the wheel so that a plurality of chambers are formed between the foils, the two adjacent spokes and the rim of the wheel with the inner end opened to the ambient atmosphere so that as the disc is rotated on the recording apparatus, centrifugal force causes the ambient to enter the chamber and produce an outward pressure on the foil so as to insure good contact between the record medium and the recording heads.

Figure 1:
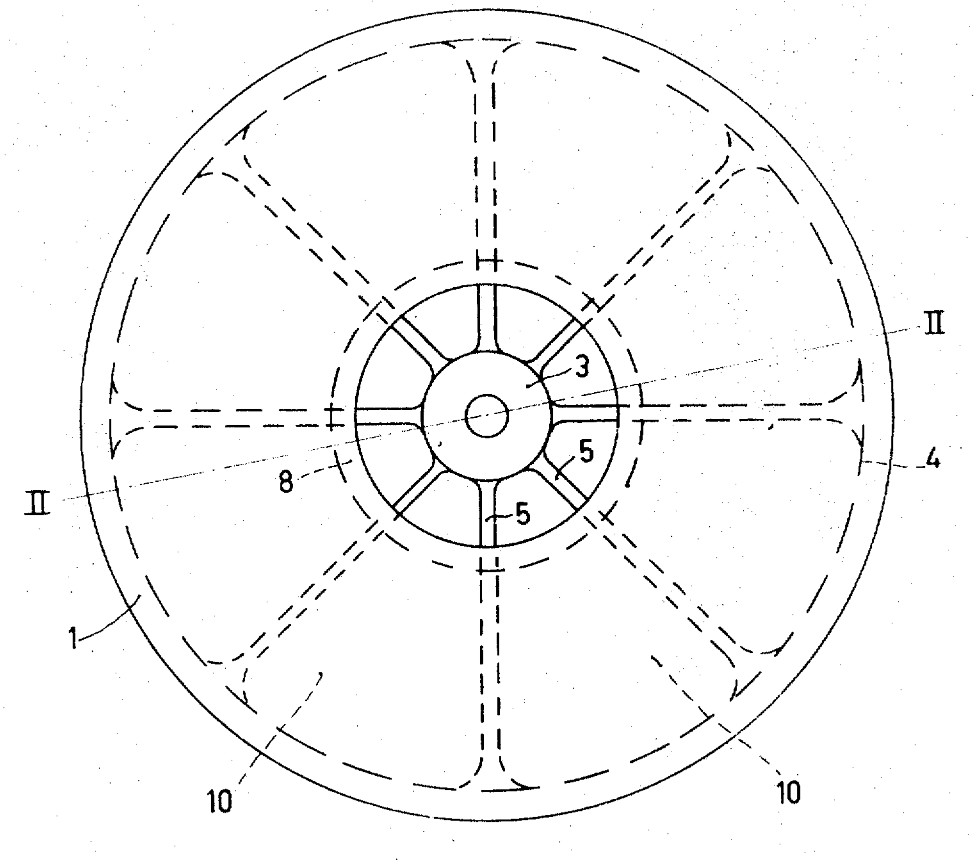

INVENTOR.
THEODOOR M.A. LIPS

BY

AGENT

MAGNETIC RECORD ELEMENT

The invention relates to an element supporting a record medium for use in an apparatus for recording and/or playing back magnetic records by means of one or more magnetic heads. The element comprises at least one disc-shaped record foil provided with a magnetizable layer as a record medium and a foil support in the form of a body of revolution, which can be fastened to a rotary shaft of said apparatus.

Elements of this type supporting a record medium are known such as is shown in U.S. S. Pat. No. 3,037,205. Other known elements have a disc-shaped foil support provided with a cup-shaped recess bounded at the circumference by an annular, upright collar across which the foil is stretched tightly in a flat state by means of stretching rings surrounding the collar. The foil is clamped between the rings which are bolted to the support with the interposition of an elastic ring. A disadvantage of this type of known record element is that the foil is constantly taut, even when the record element is out of operation, for example, stored away.

According to the present invention an element supporting a record medium of the kind set forth is characterized in that the support is provided with a plurality of chambers separated from each other by partitions extending from the center of the support towards the periphery thereof, said chambers being in open communication with the ambience near the center of the support and being otherwise closed, while the foil forms one of the boundary walls of the chambers.

As a result of the present invention the foil may be applied to the support without prestress, and the stress desired for establishing a satisfactory contact between the foil and the magnet heads is solely produced in operation. This is accomplished during rotation of the element. Centrifugal forces are exerted on the ambient medium in the chambers, usually air, and produce a small, but sufficient increase in pressure in the chambers for stretching the foil.

According to the invention the foil is preferably secured to the support by means of an adhesive.

In an appropriate embodiment of the invention the support is formed by a flat blade wheel comprising a hub, a rim and partitions connecting said hub and rim, while a record foil is provided on either side of the wheel. The two foils and the rim form boundary walls of the chambers separated by the partitions.

In this embodiment the foils preferably have a central opening of a diameter exceeding the outer diameter of the hub, while the foils are supported at the periphery from the rim and near the central opening, in addition, from a supporting ring concentric with the hub. In this embodiment the chambers of the blade wheel communicate through the spaces between the central openings in the foils and the periphery of the hub freely with the surroundings.

One embodiment of an element supporting a record medium in accordance with the invention will be described more fully with reference to the accompanying drawing.

Figure 2:
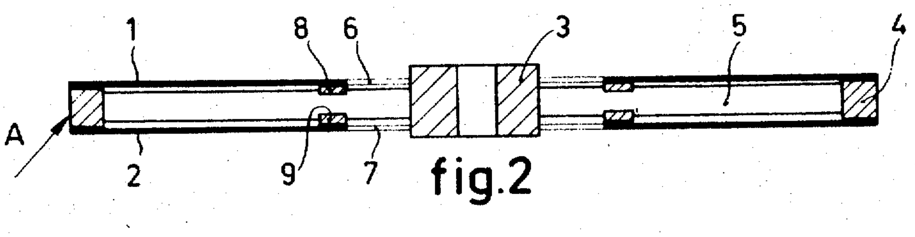

FIG. 1 is a plan view of an element supporting a record medium in accordance with the invention and FIG. 2 is a sectional view taken on the line II–II in FIG. 1.

As is shown in the drawing an element supporting a record medium in accordance with the invention comprises a support A in the form of a body of revolution for holding two disc-shaped record foils 1, 2 provided with a magnetizable layer. The support A has the shape of a flat blade wheel comprising a hub 3, a rim 4 and partitions 5 extending from the center of the support towards the periphery thereof and interconnecting the hub and the rim. The foils 1, 2 have central openings 6, 7, having a diameter exceeding the outer diameter of the hub 3. For supporting the foils near the central openings 6, 7 supporting rings 8 and 9 respectively are arranged concentrically to the hub. The foils are secured without any prestress, preferably by means of an adhesive, for example, glue, to the rim 4 and the supporting rings 8 and 9 respectively.

The partitions 5 of the blade wheel form chambers 10, the foils 1, 2 forming boundary walls thereof. The chambers 10 are in open communication near the center of the support A through the openings 6, 7 in the foils with the ambience and are otherwise closed.

The element supporting the record medium described and illustrated is intended for use in an apparatus for recording and/or playing back magnetic records by means of one or more magnet heads and can for this purpose be fastened to a rotary shaft of the apparatus. When the element is rotated, centrifugal forces are exerted on the ambient medium inside the chambers 10, for example, air, so that an increase in pressure is produced in the chambers and the foils 1, 2 arranged without prestress on the support A are stretched and a satisfactory contact between foils and magnet heads is established.

It should be noted that modifications of the embodiment described and illustrated are possible within the scope of the invention. The support A may be formed by a cup-shaped element having one record foil.

I claim:

1. A magnetic recording element comprising, a support member, a record medium carried on said support member comprising at least one disc-shaped foil having a magnetizable layer on a support body, said support member comprising a plurality of chambers being bound on at least one side thereof by said foil, a partition extending from the center of the support toward the periphery thereof separating said chambers, means located near the center of said support for communicating the ambient with each of said chambers so that as said record-carrying support is rotated, the ambient will be forced into said chambers by centrifugal force to thereby cause an outward pressure on said foil bounding the chamber so as to insure good contact between the record medium and recording and/or playback means.

2. The magnetic recording element according to claim 1 wherein said foil is secured to said support by an adhesive.

3. The magnetic recording element according to claim 2 wherein said support comprises a hub having a central bore for mounting on a shaft of recording apparatus, and a rim surrounding said hub, said partitions connecting said hub with said rim so as to form a wheel-shaped disc, said foil being provided on both sides of said wheel-shaped disc so that said chambers are enclosed at one end by said rim on two sides by adjacent partitions and bounded by said foils, said means for communicating the ambient atmosphere with each of said chambers comprising an opening between said foil and said hub.

4. The magnetic recording element according to claim 3 further comprising a supporting ring-mounted concentric with said hub, said foils being supported at its inner end from said supporting ring and at its outer end from said rim.

5. A magnetic recording element comprising a wheel-shaped disc and a record medium carried thereon, said disc comprising a central hub, having a centrally located bore so that said disc may be mounted on a recording and/or playback device, a rim concentric with said hub, a plurality of spokes connecting said rim with said hub, and a ring concentric with said hub located between said rim, said record medium comprising a pair of disc-shaped foils mounted on both sides of said wheel-shaped support member and having a central opening larger than the diameter of said hub, said foils having a magnetizable layer on a support body, said support body being secured to said support member by means of an adhesive at its outer end on said rim and at its inner end on said ring thereby forming a plurality of chambers being closed at one end by said rim and open at the other end between the inner periphery of said disc and said hub so that as said record element is rotated on said recording and/or playback device centrifugal force causes the ambient to exert an outward pressure on the inner surface of said foil so as to insure good contact between the record medium and the recording and/or playback means.